United States Patent
O'Keefe et al.

(10) Patent No.: US 9,989,679 B2
(45) Date of Patent: Jun. 5, 2018

(54) INFRARED TRANSPARENT FILM

(71) Applicant: QINETIQ LIMITED, Farnborough, Hampshire (GB)

(72) Inventors: Eoin Seiorse O'Keefe, Gosport (GB); Adam Joseph Shohet, Fleet (GB); Paul Anthony Simons, Camberley (GB)

(73) Assignee: QINETIQ LIMITED (GB)

( * ) Notice: Subject to any disclaimer, the term of this patent is extended or adjusted under 35 U.S.C. 154(b) by 0 days. days.

(21) Appl. No.: 14/349,252

(22) PCT Filed: Oct. 2, 2012

(86) PCT No.: PCT/GB2012/000757
§ 371 (c)(1),
(2) Date: Apr. 2, 2014

(87) PCT Pub. No.: WO2013/050727
PCT Pub. Date: Apr. 11, 2013

(65) Prior Publication Data
US 2014/0254000 A1    Sep. 11, 2014

(30) Foreign Application Priority Data

Oct. 4, 2011    (GB) .................................... 1117058.6

(51) Int. Cl.
*G02B 5/08* (2006.01)
*B32B 37/04* (2006.01)
(Continued)

(52) U.S. Cl.
CPC ............ *G02B 5/0808* (2013.01); *B32B 37/04* (2013.01); *F41H 3/00* (2013.01); *G02B 5/208* (2013.01); *G02B 5/26* (2013.01); *Y10T 156/10* (2015.01)

(58) Field of Classification Search
CPC . F41H 3/00; Y10T 156/10; F21V 9/04; G09F 3/02; G02B 5/0808; G02B 5/208;
(Continued)

(56) References Cited

U.S. PATENT DOCUMENTS 3,758,193 A    9/1973  Tung
5,339,198 A    8/1994  Wheatly et al.
(Continued)

FOREIGN PATENT DOCUMENTS

DE    197 10 692    9/1998
GB    1 605 261     11/1986
(Continued)

OTHER PUBLICATIONS

Tsilingiris, "Comparative evaluation of the infrared transmission of polymer films", Energy Conversion and Management, 44, 2003, pp. 2839-2856.*

*Primary Examiner* — Stephone B Allen
*Assistant Examiner* — Adam W Booher
(74) *Attorney, Agent, or Firm* — McDonnell Boehnen Hulbert & Berghoff LLP

(57) ABSTRACT

The invention relates to a thermal infrared transparent polymer film suitable for use in an identification device, said film comprising an infrared transparent polymer matrix with a pigment dispersed therein, wherein the thickness of the polymer film is greater than 30 micron and wherein the polymer film has an average transmission in the thermal infrared of greater than or equal to 0.5. Preferably, the pigment comprises an inorganic material. There is further provided a thin film, thermally reflective material (20) comprising the afore-mentioned infrared transparent film (21) and an infrared reflective layer provided on one surface thereof (22).

9 Claims, 5 Drawing Sheets

(51) Int. Cl.
*F41H 3/00* (2006.01)
*G02B 5/20* (2006.01)
*G02B 5/26* (2006.01)

(58) Field of Classification Search
CPC .......... G02B 5/26; G02B 5/124; G02B 5/136;
B32B 37/04; B32B 33/00; B32B 3/28;
B32B 3/30
See application file for complete search history.

(56) References Cited

U.S. PATENT DOCUMENTS

| | | | |
|---|---|---|---|
| 6,420,032 B1* | 7/2002 | Iacovangelo | ........... C03C 17/36 |
| | | | 428/412 |
| 6,753,075 B1 | 6/2004 | Leupolz et al. | |
| 2002/0188051 A | 10/1998 | Hugo | |
| 2003/0184866 A1* | 10/2003 | Mimura | .................. G02B 5/124 |
| | | | 359/529 |
| 2009/0252982 A1 | 10/2009 | O'Keefe et al. | |
| 2009/0296202 A1 | 12/2009 | Wei et al. | |
| 2010/0043871 A1* | 2/2010 | Xia | .......................... B29C 70/58 |
| | | | 136/251 |

FOREIGN PATENT DOCUMENTS

| WO | WO 00/42453 | 7/2000 |
|---|---|---|
| WO | WO 2006/016094 | 2/2006 |
| WO | WO 2009/064368 | 5/2009 |
| WO | WO 2009/112810 | 9/2009 |

* cited by examiner ized by amplifying the small amounts of radiation naturally available and/or supplemented by artificial light sources and reflected from surfaces. This includes near infrared radiation, by which is generally meant radiation between the visible and thermal infrared parts of the electromagnetic spectrum having a wavelength in the range 0.78 micron to 1.4 micron.
INFRARED TRANSPARENT FILM

FIELD OF THE INVENTION

The present invention relates to a coloured, infrared transparent polymer film, particularly a polymer film which is transparent in the thermal infrared waveband. The invention also relates to thin film, thermally reflective materials and identification devices comprising said materials, and methods of making thermally reflective materials.

BACKGROUND OF THE INVENTION

Infrared imaging is a widely used technology and the emergency services, enforcement agencies and armed services are equipped with both night vision systems (such as night vision goggles) and thermal infrared imaging systems. Night vision systems based on image intensifier tubes are typically used in low ambient light conditions and function by amplifying the small amounts of radiation naturally available and/or supplemented by artificial light sources and reflected from surfaces. This includes near infrared radiation, by which is generally meant radiation between the visible and thermal infrared parts of the electromagnetic spectrum having a wavelength in the range 0.78 micron to 1.4 micron.

Thermal imaging, on the other hand, can be used under all lighting conditions, including when there is no ambient lighting, in extremely low light conditions or in full daylight. This technique makes use of the fact that all bodies above 0K emit electromagnetic radiation and that in the temperature range usually encountered in inhabited regions of the earth (−20° C. to +40° C.) this radiation occurs in what is called the thermal infrared. In the thermal infrared, conventional visible markings are not obvious. At the wavelength that typical thermal infrared imagers operate (either 3-5 micron or 8-12 micron) dark and light visually coloured materials tend to have the same high thermal infrared emissivity (typically in the range 0.9 to 0.97). Thus, when at the same temperature, they emit a similar intensity of electromagnetic radiation and so they appear to be the same apparent temperature as conventional retro-reflective materials used in, for example, vehicle marking liveries. Similarly, near infrared retro-reflective materials for use with image intensifier based imaging systems have high thermal infrared emissivity (0.9 to 0.97) and are also not obvious when viewed using a thermal infrared imaging system.

As a result, identification markings designed for use at visible wavelengths and/or near infrared wavelengths have little or no contrast with the background at thermal infrared wavelengths and are not generally discernible when viewed through thermal imagers. One example of a thin film retro-reflective material which is suitable for use in the near infrared, but not in the thermal infrared, is described in U.S. Pat. No. 3,758,193 to Tung. Tung discloses a layered structured including a reflective surface and a material layer which transmits infrared radiation, but substantially absorbs visible light. The layer includes a matrix film and refractive index matched organic pigment particles, more specifically a matrix film comprising alkyds, acrylics, drying oils, polyurethanes, epoxies, polystyrenes and/or fluorinated polymers, and organic pigment particles including nitroaniline, azo and/or phthalocyanine compounds. The material is demonstrated to retro-reflect in the near infrared region, but, because of the particular selection of pigments and film materials, would not be expected to reflect radiation in the thermal infrared.

It is known to provide thermal infrared markings by providing areas of high thermal infrared emittance contrast on a surface. These areas are created by minimising both the self-emittance of thermal infrared radiation and the reflected thermal infrared energy in one area, so as to create an "apparently cold" surface, while adjacent areas having high self emittance are "apparently hot". Some parts of the sky emit little thermal infrared radiation and are apparently cold on thermal imagers, and this may be used to minimise the reflected energy component; this phenomenon is typically referred to as "cold sky reflection".

Various identification devices exist which are based on the cold sky reflection principle. WO 2006/016094 to O'Keefe discloses an identification device for marking an article comprising a plurality of layers including a first layer arranged to be substantially absorbing at at least one visible wavelength and a second layer arranged to be substantially reflective at thermal infrared wavelengths, the first and second layers typically being arranged in a stack upon a substrate comprising a polymer film such that the second layer is disposed between the first layer and substrate layer. The second layer is able to increase the thermal infrared contrast of identification markings when the device is inclined to the horizontal at an angle in the range 0° to 40° (in other words, when the device is mounted on a horizontal or near-horizontal surface).

In WO 2006/016094, the identification device is fabricated by depositing a layer of metal on a first surface of the substrate film, and depositing upon the metal layer a colour layer having a visible colouration. The colour layer is deposited as a lacquer using a technique such as roller coating, and desirably includes dyes such as azo, xanthene and anthraquinone dyes. The thickness of the colour layer is controlled to prevent absorption of the thermal infrared radiation emitted from the reflective layer, the preferred thickness being between 0.5 and 20 micrometers (micron). The identification device may also include an additional environmental protection layer deposited upon the colour layer, an example being a polyethylene layer having a thickness of 5 to 30 micron. Accordingly, in a typical embodiment, the device comprises separate substrate, reflector, colour and protection layers.

WO 2009/112810 to O'Keefe et al discloses a sheet of thermally reflective material which can undergo cold sky reflection when oriented vertically, the sheet having a surface texture comprising a plurality of reflecting elements having thermally reflective first facets. WO 2009/112810 is an example of a so-called "directional reflector", i.e. a reflector which, when viewed Normal or perpendicular to the plane of the sheet, reflects a thermal infrared scene from a different direction or spatial region to that Normal to the plane of the reflecting material. The surface texture is preferably a "sawtooth" texture, and the first facets preferably form an angle of less than 45 degrees with the plane of the sheet. WO 2009/112810 describes a flexible embodiment of the thermally reflective material formed by embossing a polymer film with a corrugated, micro-structured texture, sputter-coating the surface with a 100 nanometer (nm) layer of a silver/gold mixture and subsequently spray coating a 10 micron thick layer of matt green thermal infrared transparent material.

The inventors have found that thin film identification devices according to WO 2006/016094 and WO 2009/112810 have a number of important drawbacks, including problems arising from abrasion of reflector and/or colour layers, chemical and UV instability of the colour layer, and reduced performance in dirty and/or wet conditions.

Although WO 2006/016094 anticipates possible problems by providing an optional environmental protection layer, the provision of such a layer can itself adversely affect the performance of the device, and, moreover, increase's device complexity.

SUMMARY OF THE INVENTION

According to a first aspect of the invention there is provided a thermal infrared transparent polymer film suitable for use in an identification device, said film comprising an infrared transparent polymer matrix with a pigment dispersed therein, wherein the thickness of the polymer film is greater than 30 micron and wherein the polymer film has an average transmission in the thermal infrared of greater than or equal to 0.5.

The invention provides a pigmented thermal infrared transparent film having sufficient thermal infrared transparency to act as a coloured, thermal infrared transparent layer for a thermally reflective material or identification device, whilst at the same time providing sufficient environmental robustness to act as an environmental protection layer and sufficient flexibility to allow adhesive mounting on substantially smooth or rough surfaces that are substantially flat or having simple or complex curved surfaces, for example surfaces found on vehicles. In this way, the film can be used to replace the separate colour and environmental protection layers of prior art thermally reflective materials. Moreover, by appropriate selection of the polymer matrix and pigment, a coloured film can be obtained which is transparent in the thermal infrared, yet opaque in the visible waveband.

In general, the optimum thickness of the film depends upon the specific properties of the polymer matrix, particularly the stress to deformation ratio under application conditions and during processing, and the thermal IR transmission, and thicknesses up to 1000 micron may be acceptable, more preferably up to 500 micron and most preferably up to 100 micron. For one preferred polymer matrix, polyethylene, the aforementioned preferred upper limits apply, but more preferably, for use in a thin film reflective material, the thickness of the film is up to 75 micron, even more preferably up to 60 micron, and yet more preferably up to 55 micron.

The film thickness is greater than 30 micron, which provides the advantage that the film has sufficient mechanical robustness to be used as a substrate for the subsequent deposition of a reflector layer and optional adhesive layer, thereby obviating the need for a separate substrate layer during lay-up of a thermally reflective material, or identification device comprising same.

Preferably, the thickness of the polymer film is greater than or equal to 35 micron, even more preferably greater than or equal to 40 micron and yet more preferably greater than or equal to 45 micron.

For polyethylene, in thermally reflective thin film applications, the preferred thickness range is 35 to 100 micron, more preferably 35 to 60 micron, even more preferably 40 to 60 micron, yet more preferably 45 to 55 micron and most preferably around 50 micron.

By "transparent" is not necessarily meant completely transparent, and some absorption of thermal infrared radiation may occur. The thermal infrared transparent film has an average transmission in the thermal infrared of greater than or equal to 0.5, preferably greater than or equal to 0.70, more preferably greater than or equal to 0.80 and ideally greater than or equal to 0.90. For use in a thermally reflective material or identification device, the polymer film preferably has a transmission in one or both of the 3-5 micron and 8-12 micron wavebands of greater than or equal to 0.80, more preferably greater than or equal to 0.9 and most preferably greater than or equal to 0.92.

Many polymers have strong absorption in the thermal infrared and hence, in prior art thermal identification devices, thin polymer films are generally preferred. Typically, the thin polymer film is deposited on a reflector surface which in turn may be deposited on a suitable substrate film. This can be achieved using solutions and suspensions of polymers in the form of lacquers, paints and inks, deposited using a range of coating methods, and polymers are chosen which are suitable for use in this way. In the invention, however, the film layer is relatively thick, so the polymer matrix is preferably carefully selected to reduce absorption in the thermal infrared.

Suitably, the polymer matrix material is a polyolefin polymer, preferably a film forming polyolefin selected from the group consisting of polyethylene (including high density polyethylene, or linear low density polyethylene e.g. Ipethene® 320), polypropylene, polybutene-1, polymethylpentene, and cyclo olefin polymers (for example, Zeonex® or Zeonor® from Zeon Corporation), or any combination thereof. A particularly suitable polymer matrix is polyethylene. Polyolefins are suitable for use in thermally reflective materials and/or identification devices because they are typically chemically inert, relatively tough, have low moisture permeability, have a water repellent character and, importantly, possess few absorption bands in the parts of the thermal infrared where transparency is needed. Ideally, the polymer matrix comprises a polymer or combination of polymers which does not absorb strongly in the thermal infrared waveband, especially in the 3-5 micron and/or 8-12 micron wavelength ranges.

A pigment is dispersed in the polymer matrix to provide opacity and colour to the polymer film. In the prior art, organic dyes and pigments are often selected because, among other reasons, they are usually soluble in the coating medium. Although organic dyes and pigments typically have strong absorption bands in the thermal infrared, this is counteracted by using a thin film with a minimum concentration of organic dyes and pigments top give visual opacity and colour. In the invention, however, the film is relatively thick, and is preferably melt processed. Organic dyes tend to be degraded during compounding and melt processing, do not disperse evenly and have been found to be largely unsuitable for use in the invention for that reason. Moreover, because the organic dyes and pigments are often prone to UV bleaching, they can be unsuitable for outdoor applications such as remote identification. As a result, the type of pigment is preferably carefully selected to reduce absorption in the thermal infrared waveband, and also to ensure compatibility with the polymer matrix and/or fabrication processes and to be appropriate for outdoor use.

Preferably, the pigment comprises an inorganic material, more preferably an inorganic material selected from the group consisting of $Al_2O_3$, $BaSO_4$, $CaF_2$, CdS, CdSe, $Cr_2O_3$, Ge, $MgF_2$, Si, $TiO_2$ (Rutile), ZnSe and ZnS, or any combination thereof.

The pigment may be provided in an amount up to 60 wt %, and—in general—a higher loading of pigment may make the film more abrasion resistant. However, at high loadings the film tends to become physically less robust (more friable), so loadings up to 20 wt % are generally more preferred. Even more preferably, the amount of pigment lies in the range 1 to 20 wt %, yet more preferably 2 to 10 wt % and most preferably the amount of pigment lies in the range 2 to 5 wt %.

The pigments can also be selected to increase the thermal infrared transparency of the film, and materials and devices made from same.

By selecting suitable pigments in this way, a trade-off can be obtained between transparency in the thermal infrared, with colour and opaqueness in the visible waveband.

The polymer matrix may comprise other additives such as, for example, anti-oxidants and/or UV stabilisation additives, desiccants and/or matting agents. Such additives are preferably chosen such that they have minimal absorption in the thermal infrared waveband.

The infrared transparent film can be produced by any suitable method; for example, the film can be blown or extruded by standard methods. Typically, the selected pigment or pigments, together with any additional additives, is mixed or 'compounded' with the polymer matrix to form a "masterbatch", usually in the form of granules or prills. The masterbatch is subsequently diluted with an additional polymer matrix prior to forming the film.

According to a second aspect of the invention there is provided a thin film, thermally reflective material comprising an infrared transparent film as described above and an infrared reflective layer provided on one surface thereof. The identification device may comprise an optional adhesive layer deposited on whole or part of the infrared reflective layer. The adhesive layer may take any suitable form known to the skilled person, for example it may comprise a pressure sensitive adhesive, a release layer and a backing paper.

In the material of the invention, the infrared transparent film (or colour layer) itself acts as an environmental protection layer. As a result, the material has a simple structure and is easy to fabricate, preferably using the colour layer as a substrate onto which the infrared reflective layer is deposited. In one preferred embodiment, the identification device simply consists of a pigmented thermal infrared transparent film as described above, an infrared reflective layer provided on one surface thereof and an adhesive layer provided on whole or part of the infrared reflective layer.

Ideally, the infrared reflective layer comprises a material with a low emissivity in the thermal infrared. Typically, the infrared reflective layer comprises a material having a thermal emissivity less than or equal to 0.5, more preferably less than or equal to 0.3, even more preferably less than or equal to 0.1 and most preferably less than or equal to 0.05. In general, the lower the emissivity in the thermal infrared, the better the performance of the identification device when viewed through a thermal imager.

Metals typically have an emissivity in the thermal infrared below 0.1, so advantageously the infrared reflective layer comprises a metal or metal alloy. The metal or metal alloy can be deposited by any appropriate method, including vacuum evaporation, vacuum sputtering, electro-deposition or electro-less deposition. Preferably, the metal or metal alloy is deposited by vacuum evaporation. Suitably, the infrared reflective layer comprises a metal selected from gold, platinum, palladium, silver, copper, titanium, chromium, nickel and aluminium, or any combination thereof, or any alloy thereof. Aluminium, nickel and gold are particularly preferred. Alternatively, the infrared reflective layer can comprise a thermal infrared reflective paint.

Typically, the infrared reflective layer requires a high thermal infrared reflectivity, preferably more than 0.9 and even more preferably more than 0.95. To achieve this high thermal infrared reflectivity, the layer preferably has a thickness of about 10 nm to 200 nm for highly thermal infrared reflective metals such as gold, platinum, palladium, silver, copper and/or aluminium. The infrared reflective layer preferably has a thickness of 200 nm to 1000 nm for other preferred metals including chromium, nickel and/or titanium. Aluminium, preferably evaporated to a thickness of between 40 nm and 200 nm, more preferably between 80 nm and 120 nm, is most preferred for low heat distortion temperature polymer films such as polyethylene. To prevent heat distortion of low heat distortion temperature polymer films during vacuum evaporation of metals, thicker metal reflector layers can be built up from several thinner layers deposited sequentially. For example, 100 nm of aluminium on polyethylene can be vacuum evaporated as two sequential 50 nm layers.

The infrared reflective layer is arranged to provide direct reflection, in other words the infrared reflective layer is a planar, mirror-like surface which reflects light at an angle equal to or substantially equal to the angle of incidence. Preferably, the reflective surface is a specular reflector, but manufacturing methods may cause irregularities in the reflective surface. For example, if (as is preferred) the reflective material is deposited onto a first surface of the thermal infrared transparent colour layer, some optical properties of the reflective layer will depend on the precise surface texture of the polymer.

The second (opposing) surface of the infrared transparent layer can be textured, for example by hot embossing or cold embossing to create a desirable effect, for example an optical effect such as a required degree of "gloss" or "matt", or to create a texture to aid in water-shedding.

According to a third aspect of the invention there is provided a thin film, thermally reflective material comprising a structured infrared reflective layer and a thermal infrared transparent layer provided on one surface thereof, wherein the thermal infrared transparent layer comprises a polymer matrix with a pigment dispersed therein, and wherein the thermal infrared transparent layer forms a non-conformal coating on the structured infrared reflective layer, and wherein the polymer film has an average transmission in the thermal infrared of greater than or equal to 0.5. (It will be understood that the one surface is the structured surface.) The identification device may comprise an optional adhesive layer deposited on whole or part of the infrared reflective layer, as described above in relation to the second aspect.

Preferably, the transmission in the thermal infrared is greater than or equal to 0.70, more preferably greater than or equal to 0.80 and ideally greater than or equal to 0.90. For use in an identification device, the polymer film preferably has a transmission in one or both of the 3-5 micron and 8-12 micron wavebands of greater than or equal to 0.80, more preferably greater than or equal to 0.9 and most preferably greater than or equal to 0.92.

Preferred pigments and polymers are as described above in relation to the first and second aspects.

By "non-conformal" is meant that the infrared transparent layer does not conform to the shape of the underlying infrared reflective surface (a coating layer, for example, would typically conform to the surface).

The structured infrared reflective surface has a structure, preferably a micro-structure, which provides desired optical properties at thermal infrared wavelengths. The reflective surface may comprise a structured reflective material (such as, for example, a micro-structured metal sheet or film, preferably a corrugated metal sheet or film having an optional sawtooth profile) or may comprise a structured substrate (such as, for example, a corrugated substrate having an optional sawtooth profile) with a reflective surface deposited or otherwise provided thereon.

One example of a reflective surface that is structured to provide desired optical properties is a retro-reflective surface. In that particular case, the reflective surface may comprise a plurality of retro-reflective elements, such as, for example, a plurality of corner cube reflectors.

In a more preferred embodiment of the invention, the structured infrared reflective takes the form of a directional reflector and the invention overcomes problems associated with known directional reflecting films. A directional reflector is described in WO 2009/112810 to O'Keefe et al, the disclosure of which is incorporated herein by reference. Typically, the reflective surface comprises a plurality of directly reflecting optical elements as described in more detail below.

The directional reflector of WO 2009/112810 comprises a sheet of thermally reflective material having a surface texture comprising a plurality of reflecting elements, wherein each element has a first facet which is substantially reflective at thermal infrared wavelengths and wherein the respective first facets form an angle θ, also referred to as the major facet angle, with the plane of the sheet, the angle preferably lying in the range $0°<θ<45°$.

The first facets are generally aligned such that, in use, thermal radiation is reflected from a common direction. In other words, the facets are aligned such that, when the material is applied to an object or surface, each facet reflects substantially the same thermal image or scene and the material acts as a thermal mirror. However, because the first facets are inclined with respect to the plane of the sheet by an angle θ, the reflected scene is not the scene that would be reflected by a plain mirror. In other words, the reflected scene is not from an angle equal to the observation angle with respect to the Normal to the surface of the material. Instead, the reflected scene is from the said common direction and, in use, the material acts as a directional reflector.

So, a directional reflector has a reflective micro-structure which, in use, has inherent directional reflection, in other words, when viewed Normal or perpendicular to the plane of the sheet, the sheet reflects a thermal infrared scene from a different direction or spatial region to that Normal to the plane of the reflecting material. By selecting a suitable value for the first facet angle (i.e. major facet angle) θ, the material is able to minimise reflected radiation by directing the reflected thermal infrared radiation component to be from the "cold sky" when mounted onto a vertical or near-vertical surface.

The reflecting elements of a directional reflector may take any shape, although it is preferred that, for optimum efficiency, a shape is selected which maximises the first facet area relative to the area of any further facets and/or other surfaces of said element.

Individual reflecting elements, and the first facets thereof, need not take the same shape, but are preferably the same shape for ease of manufacture. Similarly, the reflecting elements can be positioned in any manner on the substrate, either randomly or in an ordered pattern, provided that respective first facets are suitably aligned. However, ease of manufacturing again favours ordered positioning of the reflecting elements. Moreover, it has been found that certain ordered configurations optimise the thermal reflection efficiency of the material.

Accordingly, it is preferred that the reflecting elements of a directional reflector take the same shape and are positioned in a repeating pattern on the substrate, yielding a material having a uniform surface texture. More preferably, the shape and positioning of the reflecting elements, and first facets thereof, are selected so as to maximise the thermal reflection efficiency of the material in use. Most preferably, the reflecting elements take the form of ridges or corrugations across the sheet of material, ideally ridges having a scalene triangular cross section (a so-called 'sawtooth' texture). For a sawtooth texture, the angle between the second (minor) facet and the plane of the sheet material is generally known as the minor facet angle, and the remaining angle is generally known as the apex angle. The minor facet may or may not be reflective, but is typically regarded as "non-working" with regard to the directional reflection properties of the material.

By selecting a suitable value for θ, and orienting the material such that, in use, the thermal infrared reflective first facets are directed towards the cold regions of the sky, the sheet material of the invention can be mounted on any vertical or near-vertical surface as a marking material exhibiting a 'cold spot' in a ground-based thermal imager.

In WO 2009/112810, a coloured thermal infrared transparent layer can be applied by a coating method. However, the inventors have found that sawtooth films having a conformal coating of this type have a number of important disadvantages, including poor abrasion resistance and susceptibility to contamination with surface dirt and/or water. In the preferred embodiment of the invention, the problems are overcome by providing a thin film, thermally reflective material comprising a structured infrared reflective layer and an infrared transparent layer provided on one surface thereof, wherein the infrared transparent layer comprises a polymer matrix with a pigment dispersed therein, the infrared reflective surface being structured to provide directional reflection and the infrared transparent layer forming a non-conformal coating on the surface of the structured reflective surface. The outer surface of the infrared transparent layer can be planar or substantially planar (perhaps with a degree of slight curvature due to the underlying textured reflective surface). If required, the outer surface of the polymer can be textured, for example by hot embossing or cold embossing, to create a desirable effect including gloss level and water repellence.

Depending upon the method of fabrication, the infrared transparent layer may completely fill the structured infrared reflective surface (which is generally preferred, so as to provide reliable and reproducible optical performance), or may leave slight gaps in the troughs or grooves thereof.

In effect, the infrared transparent layer provides a substantially smooth outer surface and acts as a infill material. Hence, the layer provides a combination of environmental, chemical and physical protection for the underlying structured infrared reflective surface. By using a material according to the preferred embodiment of the third aspect, therefore, problems associated with the build up of dirt and/or water (including obscuration and abrasion) can be ameliorated or substantially overcome. Advantageously, although a certain degree of visible obscuration of the reflective elements results, the desired visual colour and gloss level can be provided whilst not significantly reducing transmission in the thermal infrared.

It has been found that the infrared transparent layer can alter the directional reflection angle of the device due to refraction effects. In order to solve this problem, it is desirable to select suitable angles for the plurality of directional reflective elements with due regard to the desired reflection angle and the refractive index of the coloured layer. Preferably, therefore, the major facet angle is selected to compensate for refraction effects in the thermally transparent layer.

An optimum major facet angle can be calculated using standard techniques. For example, referring to the specific embodiment of FIG. 1, a thermally reflective material (1) comprises a reflective surface (2) having a sawtooth configuration with a major facet angle e and a thermally transmissive layer (3) which can also be described as an in-fill medium. Light (4) transmitted through the air (5) and impinging on the material (1) at an angle a is refracted at the air/in-fill boundary, reflected at the reflective surface (2) and refracted at the in-fill/air boundary giving an emerging angle f.

Using e as an input parameter, the emerging angle f can be calculated as follows, where the refractive index of air is $\eta_1$ (normally 1) and the refractive index of the in-fill medium is $\eta_2$.

Since compared to the wavelengths of interest the surfaces are essentially smooth and the materials are homogeneous and isotropic, Snell's law can be used to calculate the refracted angle b:

$$b = \sin\left(\sin(a) \times \left[\frac{\eta_2}{\eta_1}\right]\right)^{-1}$$

Since compared to the wavelength the surfaces are smooth and the materials homogeneous and isotropic, the path of the ray reflected from the major facet can be calculated by simple trigonometry. Hence, the angle d can be shown to be:

$$d = b - (2 \times e)$$

Using Snell's law the angle of the emerging ray f is given by:

$$f = \sin\left(\sin(d) \times \left[\frac{\eta_1}{\eta_2}\right]\right)^{-1} \text{ or}$$

$$f = \sin\left(\sin\left(\sin(a) \times \left[\frac{\eta_2}{\eta_1}\right]\right)^{-1} - 2 \times e\right) \times \left[\frac{\eta_1}{\eta_2}\right]\right)^{-1}$$

When $$\sin\left(\sin\left(\sin(a) \times \left[\frac{\eta_2}{\eta_1}\right]\right)^{-1} - 2 \times e\right) \times \left[\frac{\eta_1}{\eta_2}\right] \leq 0$$

the ray will be 'totally internally reflected' and thus, will not contribute significantly to the emerging.

Using the above equations, a process of optimisation can be found to determine the angle e which corresponds to a required angle f for a given refractive index of in-fill material.

The skilled person will be aware that the refractive index of the in-fill (i.e. thermal infrared transparent polymer) material can be estimated from the properties of the component materials and by applying a simple law of mixtures. Alternatively, the refractive index can be conveniently inferred from spectrophotometric measurements if representative samples of the composite are available.

Using the above methodology, it has been determined that, for a preferred device comprising a sawtooth structure of height 50 micron and non-conformal polyethylene infrared colour layer, the optimum major facet angle changes from 20° to 14°.

In the prior art, an apex angle of about 90° is preferred. In the invention, however, a reduced apex angle is preferred to minimise shadowing of the working major facet by the minor facet. To avoid retro-reflection, the angle between the minor and major facets can be increased or decreased from 90°. Advantageously, the apex angle is less than or equal to 86°, or greater than or equal to 94° more preferably in the range 80° to 84°, or 96° to 100°, even more preferably in the range 81° to 83°, or 97° to 99°. For a preferred device with a pigmented polyethylene infill and a major facet angle of 14°, the apex angle is about 82° (+/−1°) and the minor facet angle is consequently about 84° (+/−1°).

Because the infrared transparent layer acts as an infill material, with one surface typically being substantially planar and the other substantially conforming to a textured surface, its thickness is variable. Preferably, the maximum depth of the infrared transparent layer is 1000 micron, more preferably 500 micron, even more preferably 100 micron, yet more preferably 85 micron and most preferably about 50 micron.

The thin film materials according to the second and third aspects are both suitable for use in or as an identification device. Accordingly, fourth and fifth aspects provide identification devices comprising materials according to the second or third aspects.

According to a sixth aspect of the invention there is provided a method of producing a thin film, thermally reflective material comprising an infrared transparent layer and a thermally reflective layer comprising the steps of:
  (i) providing an infrared transparent film according to the first aspect;
  (ii) following step (i), providing an infrared reflective layer on a surface of the film; and
  (iii) optionally, providing an adhesive layer on the infrared reflective layer.

In the method of the invention, an identification device is fabricated by first providing an infrared transparent colour layer and then depositing an infrared reflective layer thereon. An adhesive layer is desirable, in order to affix the material to an object, and also to act as an additional protective layer for the infrared reflective layer.

The method provides the important advantage that, by using a robust thin film having a thickness in excess of 30 micron, but which is also coloured and thermally transparent, a thin film, thermally reflective material can be fabricated in a simple and convenient manner. Moreover, the structure of the final device is more simple than prior art devices because separate substrate, colour and protective layers are replaced by a single thin film material.

According to a seventh aspect of the invention there is provided a method of producing an identification device comprising the steps of:
  (i) providing a layer having a textured thermally reflective surface, said textured surface comprising a plurality of reflecting optical elements; and
  (ii) applying an infrared transparent layer comprising a polymer matrix having a pigment dispersed therein and having an average transmission in the thermal infrared of greater than or equal to 0.5 to the substrate layer so as to provide a substantially non-conformal infrared transparent colour layer.

Typically, the thickness of the infrared transparent layer is at least equal to the depth of the surface texture, and is more preferably greater than the depth of the surface texture.

Preferably, the infrared transparent layer is as specified in the first aspect of the invention.

The film layer may be applied to the substrate layer by any suitable method, such as, for example, by melt processing technique such as lamination or co-extrusion.

If the film layer is applied by a lamination technique, the lamination step is preferably conducted in the absence of adhesive. This is because adhesive materials typically absorb radiation in the thermal infrared waveband. It is also beneficial that the temperature is carefully controlled during lamination, in order to ensure that the polymer film softens sufficiently to 'flow' into the saw-tooth structure to maximise bond strength and minimise air pockets (or, in other words, to optimise the polymer in-fill). Usually, a top roller is in contact with the infrared transparent colour layer, and a bottom roller is in contact with the structured surface. The temperature depends upon a number of factors (such as, for example, the lamination speed, the layer thicknesses and the roll pressure), but, for linear low density polyethylene, the temperature is typically in the range 130° C. to 150° C. on the bottom roller (more preferably in the range 135° C. to 145° C. and most preferably around 140° C.), and typically in the range 85° C. to 105° C. on the top roller (more preferably in the range 90° C. to 100° C. and most preferably about 95° C.). The temperature and finish of the top roller imparts desirable surface texture in the thermally transparent infill material including gloss level and water shedding properties.

Preferably, the infrared reflective surface texture comprises a plurality of reflecting optical elements having directional reflection properties, ideally having a sawtooth arrangement. Ideally, for polyethylene, the major facet angle of each optical element lies in the range 13-15°.

According to an eighth aspect of the invention there is provided an infrared transparent, coloured lens comprising an infrared transparent film according to the first aspect, wherein one or both surfaces of said film has a micro-structured texture which acts as an optical lens arrangement. In other words, the micro-structure provides a lenticular array, preferably by means of a sawtooth texture on the first surface and substantially planar on the second surface.

The inventors have realised that an infrared transparent, coloured polymer can be used for making lenticular arrays, which can then be used as a precursor in the fabrication of thermally reflective identification devices, or as a lens for other applications.

A reflector layer can be provided on the second surface of the lenticular array film and hence, the invention also provides a reflective material comprising a coloured lens according to the eighth aspect and a thermal infrared reflective layer provided on the other surface of the lens. In this way, a thin film directional reflector can be provided having an alternative configuration to that described in the prior art, which configuration can be more simple to manufacture. Preferably, the lens comprises a sawtooth structure and the major facet angle is controlled to compensate for refraction effects in the colour layer.

Preferably the polymer is a polyolefin, more preferably polyethylene, and preferred pigments are as disclosed in relation to the first aspect.

According to a further aspect of the invention there is provided the use of a coloured, infrared transparent layer as a refractive lens.

Any feature in one aspect of the invention may be applied to any other aspects of the invention, in any appropriate combination. In particular film and material aspects may be applied to method aspects and vice versa. The invention extends to a film, material and method substantially as herein described, with reference to the accompanying drawings.

DESCRIPTION OF THE DRAWINGS

The invention will now be described, purely by way of example, with reference to the accompanying drawings, in which.

DESCRIPTION OF THE INVENTION

Figure 1:
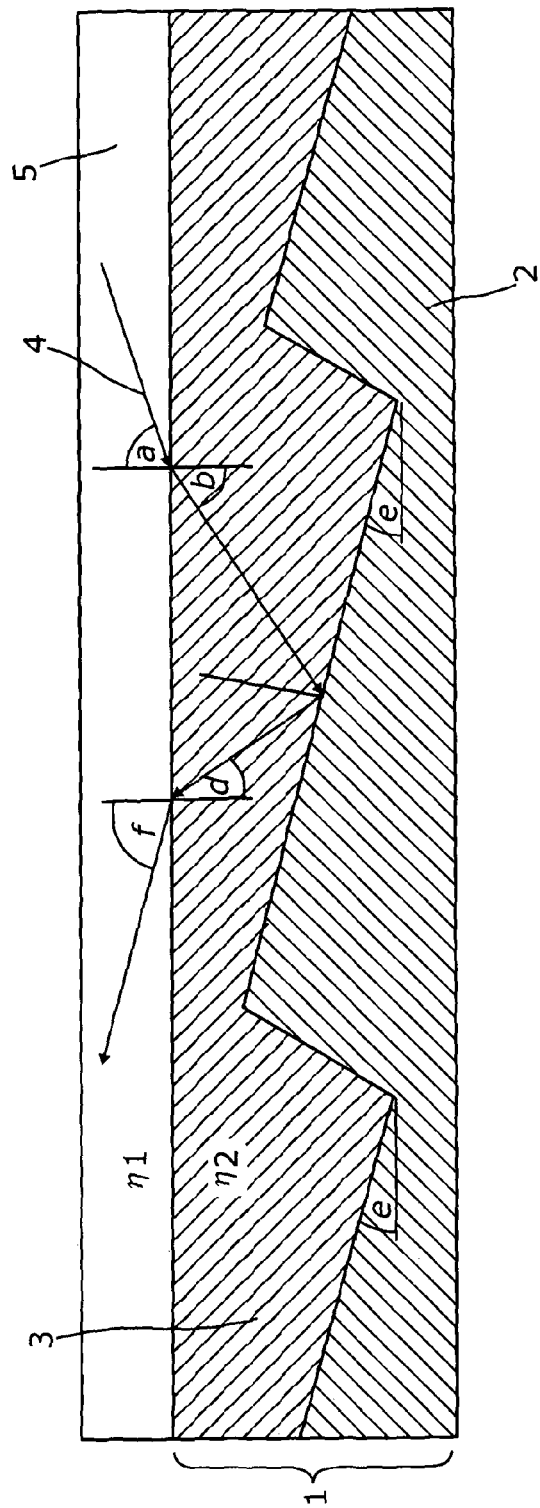
FIG. 1 is a cross-sectional, schematic representations of a preferred thermally reflective material according to the third aspect of the invention showing the optimisation of major facet angles.

FIG. 1 is a schematic representation of thin film, a thermally reflective material (1) according to a preferred embodiment of the third aspect, and is described above in relation to calculating optimum major facet angles for a sawtooth texture.

Figure 2:
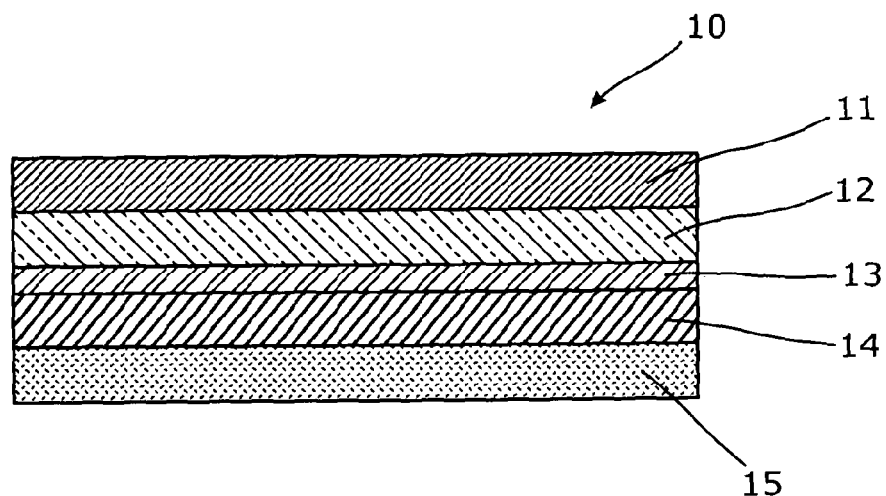
FIG. 2 is a cross-sectional, schematic representation of a prior art identification device.

FIG. 2 shows a prior art identification device (10) comprising an environmental protection layer (11), a colour layer (12), a reflector layer (13), a polymer substrate (14) and an adhesive layer (15).

Figure 3:
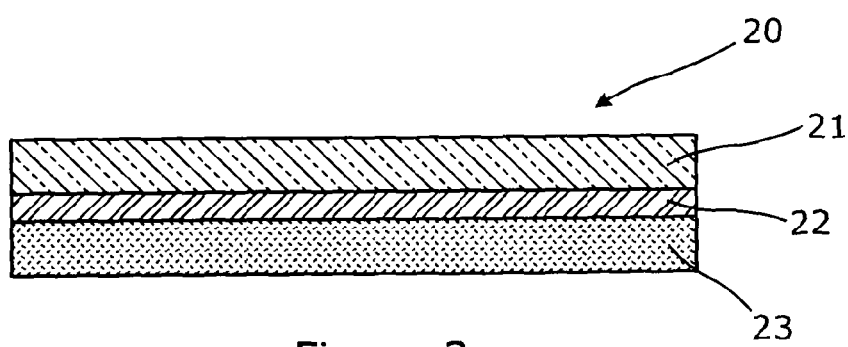
FIG. 3 is a cross-sectional, schematic representation of a thin film, thermally reflective material according to the second aspect of the invention.

By way of comparison, FIG. 3 shows the more simple identification device of the second aspect of the invention, said device (20) comprising a colour layer (21) having a thickness of greater than or equal to 35 micron, preferably about 35 to 60 micron, a reflector layer (22) having a thickness of around 100 nm, and an optional adhesive layer (23) which may, for example, comprise a pressure sensitive adhesive and a release layer. Preferably, the identification device of the second aspect consists only of the aforementioned components.

Figure 4:
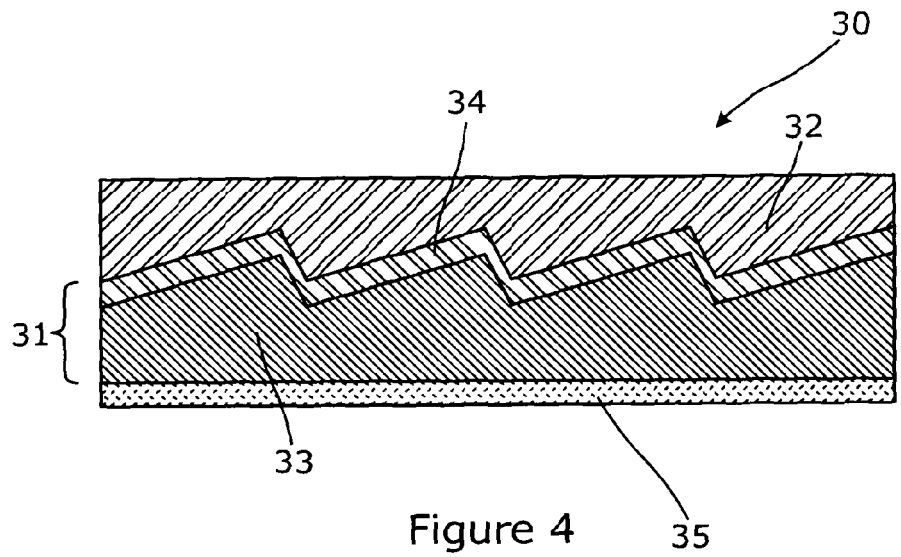
FIG. 4 is a cross-sectional, schematic representations of a thin film, thermally reflective material according to a preferred embodiment of the third aspect of the invention.

FIG. 4 shows a material (30) according to the third aspect of the invention, that is a thin film, thermally reflective materials suitable for use in or as an identification device, said film comprising a structured infrared reflective layer (31) and an infrared transparent layer (32) provided on one surface thereof, the infrared reflective surface being structured to provide desired optical properties. In this particular embodiment, the structured infrared reflective layer comprises a textured substrate (33) and a reflective coating (34), the textured substrate having a sawtooth configuration. The material comprises an optional adhesive layer (35) deposited on whole or part of the infrared reflective layer.

Figure 5:
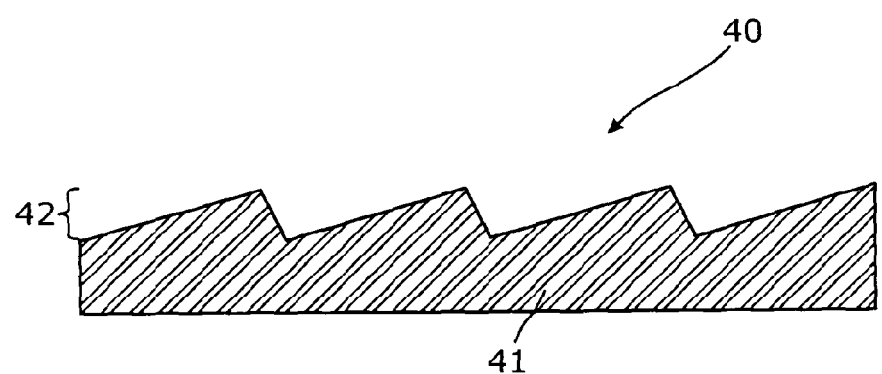
FIG. 5 is a cross-sectional, schematic representation of an IR transparent coloured lens arrangement according to the eighth aspect.

FIG. 5 shows a coloured lens (40) comprising an infrared transparent polymer film (41) comprising a polymer matrix and a pigment dispersed therein, the thickness of the polymer layer being greater than 30 micron and the average transmission of the polymer film being greater than of equal to 0.5. One surface of the lens comprises a sawtooth texture (42).

Figure 6:
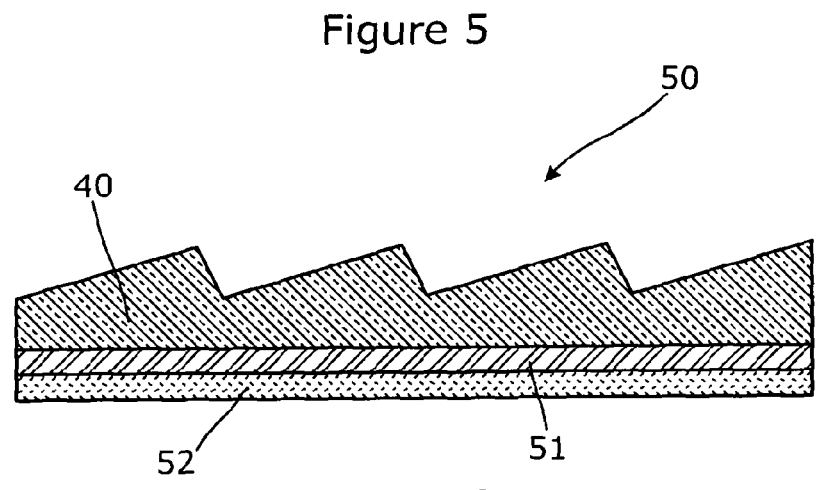
FIG. 6 is a thin film, thermally reflective material comprising the IR transparent coloured lens arrangement of FIG. 6.

FIG. 6 shows a thin film, thermally reflective material (50) comprising the coloured lens (40) of FIG. 5, a layer of reflective material (51) (such as, for example, a metal layer) on the surface opposite to the texture and an optional adhesive layer (52).

Example 1

A Beige coloured infrared transparent film was provided by mixing a 2:1 blend of Masterbatch with Ipethene® 320 (LDPE) as follows:
Masterbatch/Ipethene 320 blend at 92% by mass
UVR95 UV stabiliser at 5% by mass
AR2435 Desiccant @ 3% mass
This resulted in a pigment loading of ~7.4%.

The Masterbatch is an approximately 8% wt/wt blend of zinc sulphide, cadmium sulphide (CI Pigment Yellow 35), cadmium sulphoselenide (CI Pigment Red 108) and barium sulphate (CI Pigment White 21).

After blending, the masterbatch was blown to form a 50 micron lay-flat film.

In general, the mixture of pigments can be selected to provide a particular colour. In turn, the colour is selected based on the application and/or the field of use. A bright colour is typically selected for high visibility and/or detection. For low visibility and/or camouflage, the colour is typically chosen to match the background.

Example 2

A coloured, infrared transparent material suitable for use in an identification device was fabricated by applying a vapour deposited, 100 nm layer of aluminium to the coloured polymer film described in Example 1. A pressure sensitive adhesive was then applied to the aluminium layer, followed by a backing paper.

Example 3

A thin film, thermally reflective material suitable for use in an identification device was fabricated by co-extruding the film layer described in Example 1 with a 100 micron thick polyethylene terephthalate (PET) layer with a 50 micron deep sawtooth texture formed in UV cured acrylic resin (14° major facet angle, 84° minor facet angle, 82° apex angle) coated with a 100 nm layer aluminium, thereby producing a thermally reflective directional reflector having a non-conformal coating. A pressure sensitive adhesive was subsequently applied to the PET surface opposite the colour layer followed by a backing paper.

Figure 7A:
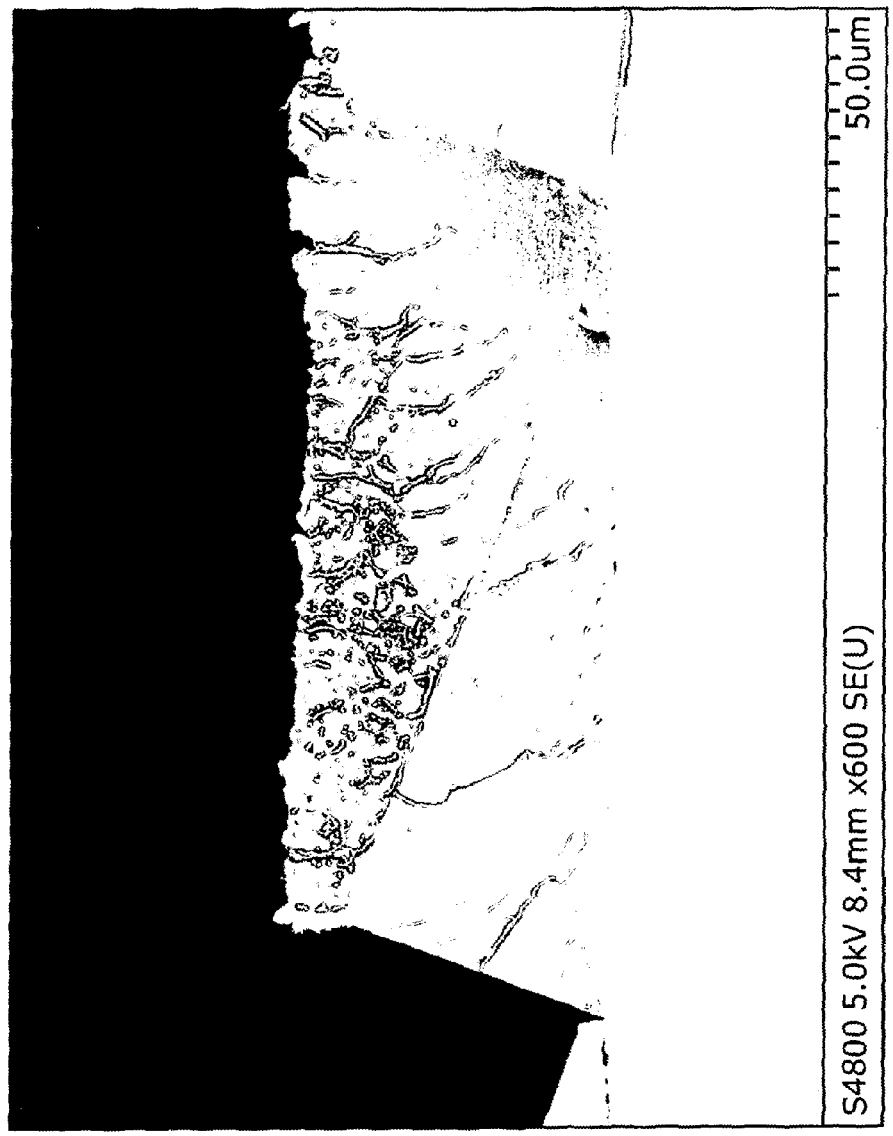
FIGS. 7a and 7b are SEM images of thin film, thermally reflective materials according to preferred embodiments of the third aspect of the invention, fabricated, respectively, by heat lamination and extrusion of an infrared transparent layer according to the first aspect.

The SEM of FIG. 7a shows the material.

Example 4

An thin film, thermally reflective material suitable for use in an identification device was fabricated by laminating the film layer described in Example 1 with a 100 micron thick polyethylene terephthalate (PET) layer with a 50 micron deep sawtooth texture formed in UV cured acrylic resin (14° major facet angle, 84° minor facet angle, 82° apex angle) coated with a 100 nm layer aluminium, thereby producing a thermally reflective directional reflector having a non-conformal coating. During lamination, the temperature of the bottom roller was 140° C. (PET side layer) and the temperature of the top roller (polyethylene layer) was 95° C. A pressure sensitive adhesive was subsequently applied to the polyurethane surface opposite the colour layer followed by a backing layer.

Figure 7B:
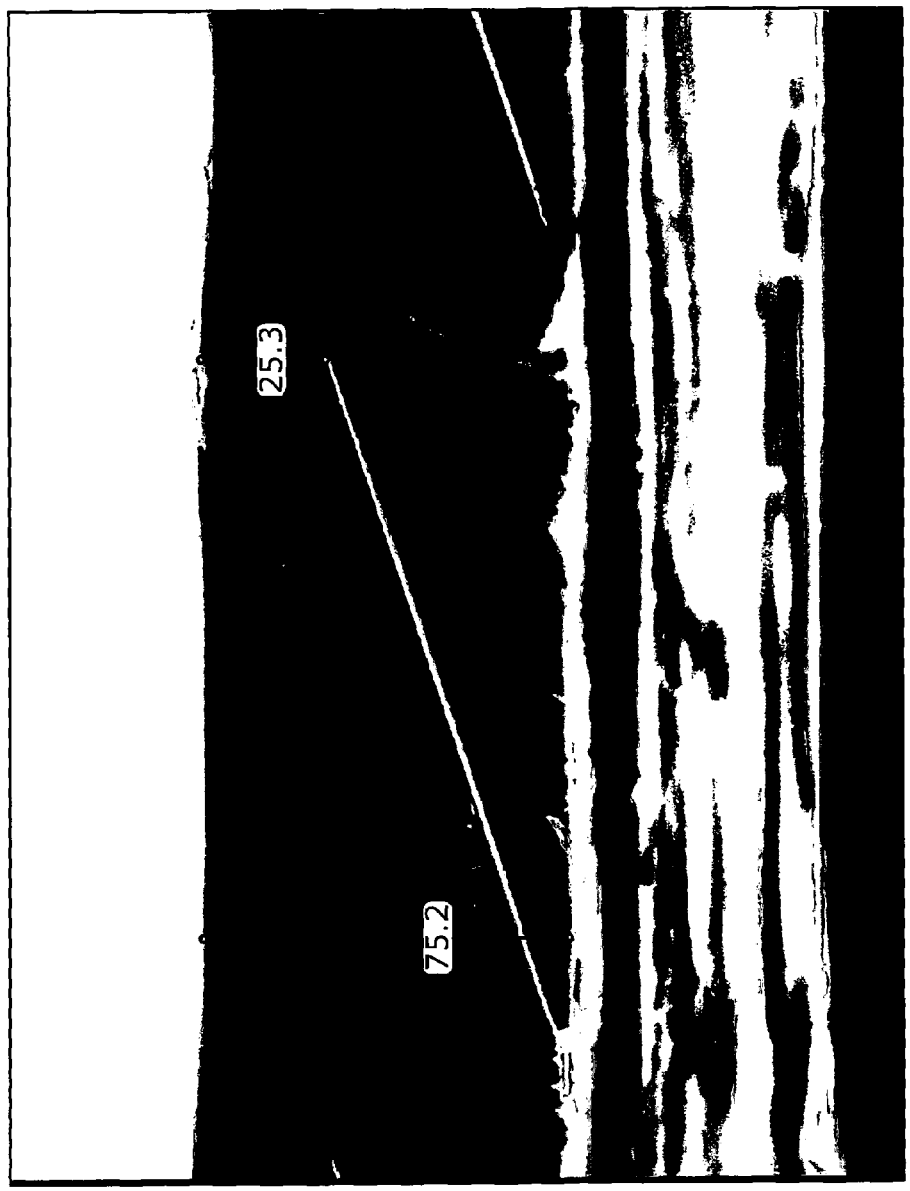

The SEM of FIG. 7b shows the material.

It will be understood that the present invention has been described above purely by way of example, and modification of detail can be made within the scope of the invention. Each feature disclosed in the description, and (where appropriate) the claims and drawings may be provided independently or in any appropriate combination.

By thermal infrared wavelengths is meant infrared wavelengths from about 2 micron to about 100 micron and the terms 'thermal radiation' and 'thermally reflective' are construed accordingly. Ideally, the reflecting surfaces are capable of reflecting thermal radiation in the specific imaging bands 3-5 micron and/or 8-12 micron.

The invention has been described with specific reference to thermal infrared identification devices, which may be used in the fields of safety and security including remote identification, remote tracking, search and rescue, road safety, industrial safety, convoy marking, group marking, simulation and/or training. It will be understood that this is not intended to be limiting and the invention may be used more generally. For example, the infrared transparent film may be used in application where it is desirable to transmit thermal infrared radiation, but inhibit visible radiation, examples being in the fields of horticulture, agriculture, silage processing and lens coating. Additional applications of the invention will occur to the skilled person.

The invention claimed is:

1. A thin film, thermally reflective material comprising: a) a structured infrared reflective layer formed of aluminium and having a thickness between 40 nm to 200 nm; and b) an infrared transparent layer provided on one surface of the structured infrared reflective layer, wherein the infrared transparent layer comprises polyethylene with an inorganic pigment dispersed therein, and wherein the infrared transparent layer forms a non-conformal coating on the structured infrared reflective layer, and wherein the infrared transparent layer has an average transmission in the thermal infrared of greater than or equal to 0.9.

2. A material according to claim 1, wherein the structured infrared reflective layer is a directional reflector.

3. A material according to claim 2, wherein the directional reflector has a sawtooth structure having a major facet angle θ.

4. A material according to claim 3, wherein the major facet angle is selected to compensate for refraction effects in the infrared transparent layer.

5. A material according to claim 3, wherein the major facet angle lies in the range 13° to 15°.

6. An identification device comprising a material according to claim 1.

7. A material according to claim 1, wherein the structured infrared reflective layer formed of aluminium has a thickness between 80 nm and 120 nm.

8. A material according to claim 1 wherein the infrared transparent layer has a depth no greater than 100 microns.

9. A material according to claim 1 wherein the infrared transparent layer has a depth no greater than 50 microns.

* * * * *